United States Patent
Kamm et al.

(10) Patent No.: US 6,725,674 B1
(45) Date of Patent: Apr. 27, 2004

(54) DEVICE AND METHOD FOR CRYOGENIC FREEZING

(75) Inventors: Volker Kamm, Höllriegelskreuth (DE); Michael Sonnentag, München (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/089,609

(22) PCT Filed: Sep. 29, 2000

(86) PCT No.: PCT/EP00/09583

§ 371 (c)(1),
(2), (4) Date: Aug. 19, 2002

(87) PCT Pub. No.: WO01/24646

PCT Pub. Date: Apr. 12, 2001

(30) Foreign Application Priority Data

Oct. 1, 1999 (DE) .......................................... 199 47 333
Sep. 14, 2000 (DE) .......................................... 100 45 826

(51) Int. Cl.⁷ ........................... F25D 13/06; F25D 17/02
(52) U.S. Cl. ............................................. 62/63; 62/374
(58) Field of Search ............................. 62/63, 341, 374

(56) References Cited

U.S. PATENT DOCUMENTS

| 3,688,518 | A | * | 9/1972 | Goltsos | .................... 62/374 |
|---|---|---|---|---|---|
| 3,701,263 | A | * | 10/1972 | Barrett | ...................... 62/63 |
| 3,882,686 | A | * | 5/1975 | Rose | ............................ 62/63 |
| 4,196,802 | A | * | 4/1980 | Lorentzen | ................ 198/465.3 |
| 4,944,162 | A | * | 7/1990 | Lang et al. | ................... 62/380 |
| 5,170,631 | A | | 12/1992 | Lang et al. | |
| 5,277,301 | A | * | 1/1994 | Fenty | ......................... 198/778 |
| 5,343,714 | A | * | 9/1994 | Kiczek et al. | ............... 62/381 |
| 5,343,715 | A | | 9/1994 | Lang | |
| 5,452,588 | A | * | 9/1995 | Onodera | ...................... 62/63 |
| 5,520,013 | A | * | 5/1996 | Kuo | ............................. 62/63 |
| 5,551,251 | A | * | 9/1996 | Ochs et al. | ................... 62/380 |
| 6,334,330 | B2 | * | 1/2002 | Lang et al. | ................... 62/374 |

FOREIGN PATENT DOCUMENTS

WO         98/24325         6/1998

* cited by examiner

*Primary Examiner*—William C. Doerrler
(74) *Attorney, Agent, or Firm*—Crowell & Moring LLP

(57) ABSTRACT

A device and a method for cooling material exposes a material to a certain supply of cryogenic coolant using a conveying device. The configuration of the conveying device permits airtight packaging of the material and is designed according to a principle that is very similar to the paternoster conveying principle. The temperature in the device for cooling material can be set by metering devices for the cryogenic coolant. The airtight packaging of the material and the adjustable temperature setting provide an energy-efficient freezing unit with a small floor space requirement.

41 Claims, 2 Drawing Sheets

DEVICE AND METHOD FOR CRYOGENIC FREEZING

FIELD OF THE INVENTION

The invention relates to a device for cooling material in a housing, which has a feeder for cryogenic coolant, which is connected to a source for a cryogenic coolant, as well as means to move the material to be cooled through the device, as well as a method for cooling material in a housing in which the cryogenic coolant is supplied, whereby the material is moved through the housing.

BACKGROUND OF THE INVENTION

For the cryogenic cooling, which includes cryogenic freezing as well as cryogenic chilling, freezing equipment such as spiral freezers, tunnel freezers or freezing cabinets are usually used. The materials to be cooled are, for example, foodstuffs, are moved in these devices largely with the help of belts. These expanded freezing cabinets are partly constructed as very large units.

The task of this invention is to provide a device and a method for cryogenic cooling of material that is distinguished by a small floor space requirement for the cabinet in relationship to the material capacity obtainable per unit of time and to provide an efficient utilization of energy.

SUMMARY OF THE INVENTION

This task is solved according to the invention by way of a device that is provided with at least two towers with material carriers, one of which makes possible an upward movement of the material carrier as well as another which makes downward movement of the material carrier possible, whereby at both ends of the tower, means for transporting the material carrier toward one of the towers and/or away from one of the towers is provided, as well as means for lifting and lowering the towers and means for locking the towers into position.

The means for transporting the material carrier is preferably configured in such a way that a transport of the material carrier from a loading station for the material to one of the towers, as well as from one of the towers to another tower and from the other tower to the unloading station for the cooled material can take place. It is particularly preferred that the towers show the material carriers stacked on top of each other. In a preferred embodiment of the invention, the means for transporting the material carriers from one tower to another tower at the upper end of the towers, as well as the means for transporting the material carriers from the loading station to one of the towers and from one of the towers to the unloading station for the material at the lower end of the towers are provided. Expediently, means is available at the loading station, such as a spring belt, as well as means at the unloading station, such as a pusher.

The feeder for cryogenic coolant is advantageously arranged close to a device for producing a gas flow. This device is preferably designed as a ventilator. This arrangement provides a device that causes the product to be cooled to be subjected to a forced convection. The cryogenic coolant cools the surrounding gas and can thus be described as a convection medium.

A further development of the present invention provides that several devices for supplying the cryogenic coolant and/or several devices for producing the gas flow are arranged close to each other as well as at various points in the device. The feeders for cryogenic coolant preferably have a metering device which helps to ensure that each of the various feeders have an adjustable amount of cryogenic coolant available. In this way, the desired values for cooling capacity and thus the desired temperatures in the device can be set; in particular, different temperatures in different areas of the device can be set. Partitions are expediently provided between the various temperature areas. It is particularly preferred that the feeder for cryogenic coolant have at least one nozzle.

The invention may further be designed so that the means for transporting material carriers as well as the means for locking the towers into position have a hydraulic moving device. Mechanical moving devices are also preferably used. A suitable mechanical moving device would be, for example, a chain drive or a crank-driving mechanism. Another possibility consists of designing a pneumatic moving device. The moving device is advantageously designed so that it is electrically operated.

It proves to be an advantage to design the material carrier so that it is open on the sides on which devices for supplying cryogenic coolant are arranged. Likewise, it is advantageous to provide a stack reinforcer for the stacking of the material carrier. The stack reinforcer is advantageously designed so that it is open on the sides on which the devices for supplying cryogenic coolant are arranged. It is especially preferred that the material carriers are designed as metal sheets, particularly as metal sheets that are suitable for picking up food. The metal sheets are designed in such a way that they are horizontally navigable for a transport car, particularly for a transport car designed as a sliding carriage.

It is advisable to provide mechanical means for lifting and lowering the towers, such as a linear drive or a crank-driving mechanism. Hydraulic means proves to be advantageous for moving the towers. Another possibility is a configuration with pneumatic means. Of course, the invention can be further developed via electric driving means.

Preferably, means for loading the material to be cooled is provided. It is advisable to provide means for the unloading of the material. Advantageously, means for loading as well as means for unloading at the same height are provided. The invention is further developed by material-compatible conveying systems for loading and unloading the material. For example, a spring belt is provided for loading the material, as well as a pusher for removing the material from the material carriers. Another advantageous further development of the invention consists of designing the means for transporting the material carriers in such a way that the material carriers can be tipped. Thus the material can slide down from a slanted material carrier and be unloaded in this way. The tipping movement is preferably driven electrically, hydraulically, pneumatically or mechanically.

A further development of the device provides means for transporting the unloaded material back to the loading station of the device. As a result, the device has only one side that can be used and thus has a reduced floor space requirement. Particular advantageous for transporting material and material carriers is the sliding carriage, which transport material from the loading end to the unloading end of a tower and, once it has passed through at least two towers, picks up the material at the unloading end of the corresponding tower and transports it to the unloading side or back to the loading side, as desired.

Preferably, means for controlling and/or monitoring and/or regulating the cooling of the material is provided in the device. For example, a central SPS control device is designated for this purpose. The means is advantageously designed so that a fully automatic, quasi-continuous operation is possible.

Particularly for a permanent operation, the device preferably has a housing, which is designed as a thermally insulated cell.

The task at hand is solved with a method that the material on the material carriers is moved through the housing with automatic stacking, whereby at least two towers are constructed, whereby at least one tower is lifted and at least another tower is lowered, respectively, and whereby the towers are at least intermittently locked into position, as soon as the material carriers at the end of the tower are transported toward one of the towers and/or away from one of the towers. The material is moved similar to the movement of a conveyor device based on the principle of a paternoster lift.

In a preferred embodiment of the invention, the material carriers at the upper end of the towers are moved from one tower to another tower, as well as transported at the lower end of the towers from the loading station to one of the towers and from the other tower to the unloading station for the material. The material is expediently loaded at the loading station by loading means, such as a spring belt, and unloaded at the unloading station by unloading means, such as a pusher.

According to another configuration of the invention, the means for transporting the material carriers is tipped to unload the cooled material, by way of which the material is unloaded in a simple and quick manner.

Depending on the configuration of the method, the material carriers are moved mechanically and/or hydraulically and/or pneumatically and/or electrically, particularly advantageously horizontally and/or vertically moved.

A further development of the method provides that the cryogenic coolant is sprayed.

It is particularly preferred that the cryogenic coolant be supplied near a device that products a gas flow. The cryogenic coolant is supplied with particular advantage near a device designed as a ventilator. The use of nitrogen as cryogenic coolant proves to be particularly advantageous.

According to a particularly preferred embodiment of the invention, the cryogenic coolant is supplied to several feeders of the device for cooling material. It proves to be advantageous if the cryogenic coolant flows around the material to be cooled, which is subjected to a forced convection. Particularly advantageously, at least one ventilator for the production of the forced convection is used. It is recommended that the material of the cryogenic coolant flow in an approximately parallel direction to the material carriers, which is achieved by the use of deflector plates.

The cryogenic coolant preferably flows around the material in each of the adjoining material carriers, alternately once on one side and once on the other side. With this configuration of the invention, the cryogenic coolant is preferably supplied parallel to the supporting surface for the material on the material carriers, and actually over the supporting surface of each individual material carrier.

According to a further development of the invention, the cryogenic coolant is guided in such a way that a pre-cooling zone is formed in the area close to the loading material carrier, in which the cryogenic coolant cools and/or freezes the surface of the material to be cooled. In addition, the material that is still comparably hot on the material carriers near the loading area is advantageously pre-cooled in this manner. This pre-cooling is already achieved by the expansion of the cryogenic coolant, without, for example, using a ventilator in this area to produce a forced convection.

The invention is particularly suited to the cooling of foodstuffs. The temperature in the device according to the invention is expediently set by metering the amount of the cryogenic coolant per unit of time. Of course, the invention can be further developed, so that the metering of the cryogenic coolant can be set differently for at least two different feeders. As a result, at least two zones are formed in the housing in which different temperatures prevail.

Partitions are expediently used to divide these areas, which permits the temperature differences to be maintained over long periods of time. In addition, a slight temperature gradient is also set in the individual zones, since the temperature increases the greater the distance from the feeders for cryogenic coolant.

It is recommended to provide outlets for discharged fluids, such as water, on the floor of the housing.

For certain, e.g. breakable materials, it proves to be an advantage if the material is loaded or unloaded in combination with the material carriers. For example, slightly crushable foodstuffs lying on the metal sheets used as material carriers are loaded and unloaded.

Another particularly energy-efficient possibility consists of loading and unloading the material separately from the material carriers. The material carriers remain in the housing in this case and thus assume the function of a cold storage, which reduces the energy requirement of the device and of the method.

It is also an advantage if the material at the same height is loaded and unloaded. The loading and unloading preferably takes place on the loading side of the device. This measure makes it possible to further reduce the floor space requirement of the device.

The invention offers a series of other important advantages.

The device according to the invention has a very small floor space requirement in relationship to the freezing capacity of the device for cryogenic coolant. The floor space requirement is principally determined by the conveying device, which has a substantially reduced floor space requirement due to a design similar to a paternoster conveyor. Another crucial advantage, in contrast to the conventional paternoster principle, is that the invention has very few movable parts and generally few built-in components in the housing. As a result, it has a high operating reliability, as well as being a device that is very easy to clean.

The invention according to a preferred embodiment in which the towers are constructed of stacked material carriers does not even have any moving parts in the tower. In addition, a very simple and basic cleaning of the towers by removal of the material carriers is possible. Another advantage is that the material carriers can be completely removed from the device for maintenance purposes.

The stacking of the materials to be cooled in a vertical direction according to the invention also makes it possible to expand the device upwards, providing an advantageous adjustment to the required freezing capacity. The airtight packaging of the material to be cooled that is achieved with the invention permits an efficient utilization of the energy used. This advantage is further expanded by the possibility of leaving the material carriers for several cooling processes with new material to be chilled in the freezer.

The use of food-compatible materials in the device according to the invention is also advantageous. It is particularly advantageous that all essential components of the invention have been manufactured with food-compatible materials.

Another advantage is the use of a housing for cooling the material: the housing is preferably provided with a vent for evaporated coolant, so that no release of the coolant vapor takes place in the room in which the device according to the invention is operating. Furthermore, the housing is advantageously insulated, so that energy losses via the external walls of the housing are minimized.

Below, the invention is explained in detail on the basis of a schematically drawn embodiment in the figures.

DETAILED DESCRIPTION OF THE DRAWINGS

Figure 1:
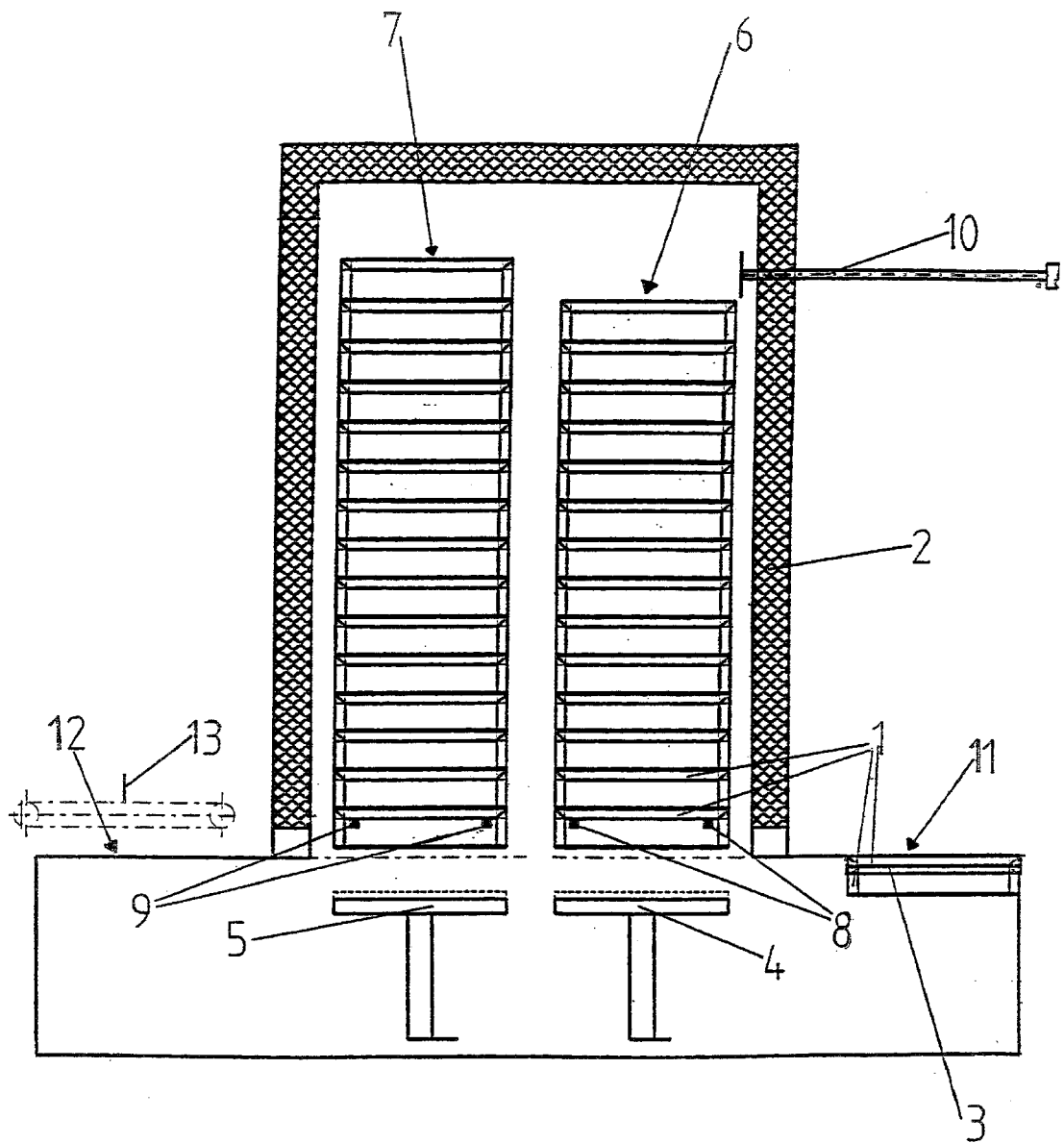
FIG. 1 shows a front view of two towers according to the invention, with a lifting device, a moving device and a sliding carriage.

On the basis of FIG. 1, the movement of the material carrier 1 is explained for the case in which the material carrier 1 leaves the housing 2.

Lifting devices 4, 5 are used as a means for lifting and lowering of the towers 6, 7. To lock the towers 6, 7, into position, locking mechanisms are used. A material carrier 1 is transported by the sliding carriage 3 from the loading station 11 to the position between the right lifting device 4 and the right tower 6. The right locking mechanism 8 is locked, the right lifting device 6 lifts the tower to the height of the material carrier and the right locking mechanism is again locked into position. Subsequently or simultaneously, the left lifting device 5 is lifted, the left locking mechanism 9 is released and the left lifting device 5 is lowered again. Subsequently, the uppermost material carrier of the right tower 6 is moved by the moving device 10 to the left tower 7. Once the left locking mechanism 9 is locked into position, the lowest material carrier can be removed with the help of the sliding carriage 3 from the housing and transported from the left tower 7, and a new cycle begins. With a number x at the existing material carrier 1 in two towers 6, 7, a certain material carrier requires x cycles to be transported through the housing 2. A pusher 13 is available at the unloading station 12 for removing the material from the material carrier 1.

Figure 2:
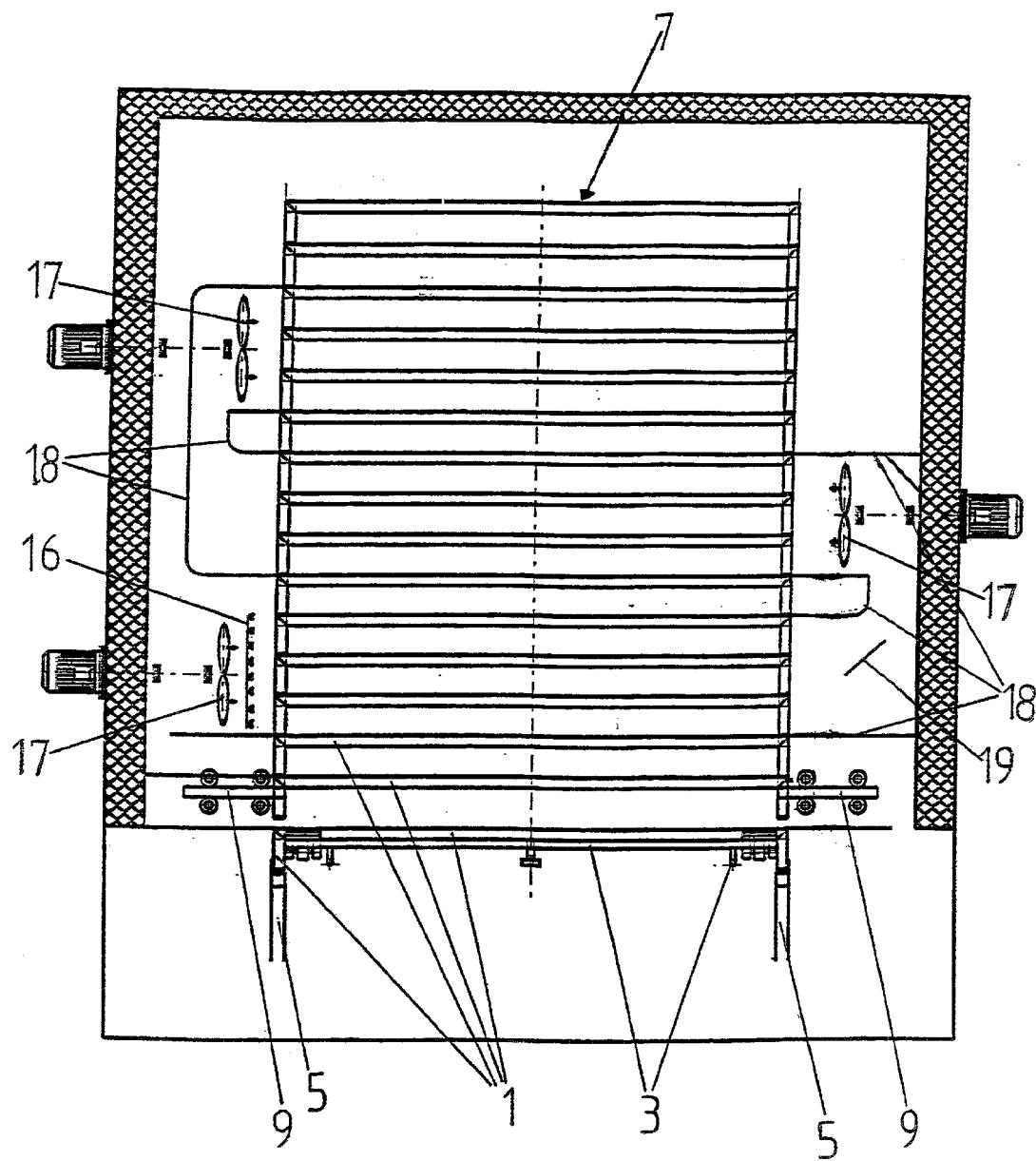
FIG. 2 shows a side view of the object shown in FIG. 1 with supply for cryogenic coolant, ventilators and partitions.

The illustration in FIG. 2 shows the feeder for cryogenic coolant 16, as well as the ventilators 17 for producing the forced convection. Deflector plates 18 are also shown, which are applied for guiding the movement, as well as a device for detecting temperature 19 and the locking mechanism 8. The sliding carriage 3 with material carrier 1 is located in this illustration in the position between the left lifting device 5 and the left tower 7. The left locking mechanism 9 is shown in the unlocked position.

What is claimed is:

1. A device for cooling material in a housing, comprising:
    a feeder for cryogenic coolant;
    a mover to move the material through the device;
    at least two towers, each having a first end and a second end;
    a material carrier for each tower;
    a transporter for transporting the material carriers toward and/or away from one of the towers;
    a lifter for lifting and lowering the towers; and
    a lock for locking the towers into position,
    wherein said feeder for cryogenic coolant is connected to a source for cryogenic coolant,
    wherein one of said towers permits upward movement of one of said material carriers and another of said towers permits downward movement of one of said material carriers; and
    wherein said feeder for cryogenic coolant is arranged close to a mechanical device for producing a gas flow.

2. A device according to claim 1, wherein said device for producing a gas flow is a ventilator.

3. A device according to claim 1, wherein a plurality of devices for supplying cryogenic coolant and/or a plurality of said devices for producing a gas flow are arranged close to one another at various points in the device.

4. A device according to claim 1, wherein said feeder for cryogenic coolant has at least one nozzle.

5. A device according to claim 2, wherein said feeder for cryogenic coolant has at least one nozzle.

6. A device according to claim 3, wherein said feeder for cryogenic coolant has at least one nozzle.

7. A device according to claim 1, wherein said transporter and said lock have at least one moving device selected from the group consisting of hydraulic moving devices, pneumatic moving devices, mechanical moving devices, and electric moving devices.

8. A device according to claim 1, wherein said moving device lifts and lowers said towers.

9. A device according to claim 7, wherein said moving device lifts and lowers said towers.

10. A device according to claim 1, further comprising a material pick-up device.

11. A device according to claim 1, further comprising a pusher.

12. A device according to claim 10, wherein said material pick-up device is a pusher.

13. A device according to claim 1, wherein said transporter further comprises a moving device capable of tipping the transporter.

14. A device according to claim 7, wherein said at least one moving device is capable of tipping the transporter.

15. A method for cooling material in a housing supplied with cryogenic coolant, comprising:
    providing material on automatically stacked material carriers;
    moving the material through the housing;
    lifting at least one tower and lowering at least one other tower;
    at least intermittently locking said towers into a desired position;
    transporting the material carriers at the end of the towers toward one of the towers and/or away from one of the towers; and
    wherein the cryogenic coolant is supplied close to a mechanical device for Producing a gas flow.

16. A method according to claim 15, wherein the material carriers are shifted horizontally or moved vertically with a power selected from the group consisting of mechanical, hydraulic, pneumatic, and electric.

17. A method according to claim 15, wherein the cryogenic coolant is sprayed.

18. A method according to claim 15, wherein the cryogenic coolant is cryogenic nitrogen.

19. A method according to claim 17, wherein the cryogenic coolant is cryogenic nitrogen.

20. A method according to claim 15, wherein the cryogenic coolant is supplied close to a ventilator.

21. A method according to claim 15, wherein the cryogenic coolant is supplied to at least two feeders of a device for cooling material.

22. A method according to claim 17, wherein the cryogenic coolant is supplied to at least two feeders of a device for cooling material.

23. A method according to claim 18, wherein the cryogenic coolant is supplied to at least two feeders of a device for cooling material.

24. A method according to claim 20, wherein the cryogenic coolant is supplied to at least two feeders of a device for cooling material.

25. A method according to claim 15, wherein the cryogenic coolant is subjected to a forced convection and flows around the material to be cooled.

26. A method according to claim 17, wherein the cryogenic coolant is subjected to a forced convection and flows around the material to be cooled.

27. A method according to claim 18, wherein the cryogenic coolant is subjected to a forced convection and flows around the material to be cooled.

28. A method according to claim 25, wherein at least one ventilator is used for producing the forced convection.

29. A method according to claim 27, wherein at least one ventilator is used for producing the forced convection.

30. A method according to claim 15, wherein the cryogenic coolant flows around the material in a direction approximately parallel to the material carriers.

31. A method according to claim 25, wherein the cryogenic coolant flows around the material in a direction approximately parallel to the material carriers.

32. A method according to claim 30, wherein the cryogenic coolant flows around the material in each adjoining material carrier alternating once from one side and once from the opposite side.

33. A method according to claim 31, wherein the cryogenic coolant flows around the material in each adjoining material carrier alternating once from one side and once from the opposite side.

34. A method according to claim 15, further comprising guiding the cryogenic coolant to create a pre-cooling zone close to the loading material carriers, wherein the expanding cryogenic coolant hardens the surface of the material to be cooled.

35. A method according to claim 25, further comprising guiding the cryogenic coolant to create a pre-cooling zone close to the loading material carriers, wherein the expanding cryogenic coolant hardens the surface of the material to be cooled.

36. A method according to claim 28, further comprising guiding the cryogenic coolant to create a pre-cooling zone close to the loading material carriers, wherein the expanding cryogenic coolant hardens the surface of the material to be cooled.

37. A method according to claim 15, wherein the material to be cooled is food.

38. A method according to claim 15, further comprising metering the amount of cryogenic coolant supplied per unit of time to set the temperature in the device.

39. A method according to claim 34, further comprising metering the amount of cryogenic coolant supplied per unit of time to set the temperature in the device.

40. A method according to claim 38,
wherein said metering of the cryogenic coolant differs for at least two different feeders for the cryogenic coolant, and
wherein the differently metered feeders for cryogenic coolant form at least two different temperature zones in the housing.

41. A method according to claim 39,
wherein said metering of the cryogenic coolant differs for at least two different feeders for the cryogenic coolant, and
wherein the differently metered feeders for cryogenic coolant form at least two different temperature zones in the housing.

* * * * *